US008321078B2

(12) United States Patent
Vial (10) Patent No.: US 8,321,078 B2
(45) Date of Patent: Nov. 27, 2012

(54) METHOD AND DEVICE FOR ASSISTING IN THE CONTROL OF THE ON-BOARD SYSTEMS IN A AIRCRAFT

(75) Inventor: Jean-Sebastien Vial, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 545 days.

(21) Appl. No.: 12/539,159

(22) Filed: Aug. 11, 2009

(65) Prior Publication Data

US 2010/0204855 A1 Aug. 12, 2010

(30) Foreign Application Priority Data

Aug. 20, 2008 (FR) ...................................... 08 55653

(51) Int. Cl.
*G06F 7/70* (2006.01)
*G06F 19/00* (2006.01)
*G06G 7/00* (2006.01)
*G06G 7/76* (2006.01)
*G08B 21/00* (2006.01)
*G01C 21/00* (2006.01)
*G01C 23/00* (2006.01)

(52) U.S. Cl. ............................ 701/14; 340/945; 340/971

(58) Field of Classification Search .................... 701/10, 701/14; 340/945, 971
See application file for complete search history.

(56) References Cited

U.S. PATENT DOCUMENTS

| 4,635,030 | A  | * | 1/1987 | Rauch ........................... 340/945 |
| 5,454,074 | A  |   | 9/1995 | Hartel et al. |
| 5,522,026 | A  | * | 5/1996 | Records et al. ................ 715/710 |
| 5,808,563 | A  | * | 9/1998 | Ching et al. ................... 340/976 |
| 5,883,586 | A  | * | 3/1999 | Tran et al. ..................... 340/945 |
| 6,697,718 | B2 | * | 2/2004 | Le Draoullec et al. ......... 701/29 |
| 6,842,122 | B1 |   | 1/2005 | Langner et al. |
| 6,946,976 | B1 |   | 9/2005 | Langner et al. |
| 7,188,006 | B2 | * | 3/2007 | Salvado et al. .................... 701/3 |
| 7,772,995 | B2 | * | 8/2010 | Cabaret De Alberti et al. ............................. 340/980 |
| 2007/0142980 | A1 | | 6/2007 | Ausman et al. |

* cited by examiner

*Primary Examiner* — Khoi Tran
*Assistant Examiner* — Nicholas Kiswanto
(74) *Attorney, Agent, or Firm* — Oblon, Spivak, McClelland, Maier & Neustadt, L.L.P.

(57) ABSTRACT

The object of the invention is in particular a method and a device for aiding in the control of systems installed on board an aircraft comprising at least one display device capable of displaying configuration parameters of the said aircraft and at least one associated acquisition device. After the state of the said aircraft has been determined (900), a plurality of elements to be displayed on the said at least one display device is selected (905), according to the said state of the said aircraft, in a predetermined set of elements comprising at least one parameter for configuration of the avionics, at least one parameter for configuration of support subsystems and at least one activatable representation of least one command of support subsystems of the said aircraft. The said plurality of elements is displayed on the said display device.

14 Claims, 8 Drawing Sheets

METHOD AND DEVICE FOR ASSISTING IN THE CONTROL OF THE ON-BOARD SYSTEMS IN A AIRCRAFT

The present invention relates to the management of systems installed on board aircraft and more particularly to a method and a device for aiding in control of systems installed on board an aircraft in order to improve the control interface of these systems.

The electronic and networking systems installed on board aircraft relate to distinct functionalities. A first type of systems, known as avionic, relates to assisting the aircraft crew in assuring its tasks of piloting, navigation, communication, environmental monitoring and mission management. This type of systems relates in particular to flight control systems, the automatic pilot, communication (voice and data) and navigation systems (radio, inertial, autonomous) systems and environmental monitoring systems (radar, weather, ground anti-collision and traffic anti-collision). In particular, mission management systems permit the pilot to manage his trajectory (ground preparation, flight tracking and modification) on the basis of airline company requirements, of integration of the aircraft into the air traffic and of the environment, such as weather reports and NOTAMs (acronym for NOtice To Air Men in English terminology). The second type of systems relates to generation and distribution of electrical capacity, generation and distribution of hydraulic capacity, generation of pneumatic capacity, air conditioning and pressurization, fuel management and the auxiliary power engine, known collectively as aircraft support subsystems.

These systems are independent of one another. They are controlled via separate interfaces.

In general, the control interfaces of the avionics and of mission management are disposed facing the pilot and on his sides, under the windshield, the control interface of the support subsystems being placed on the ceiling, between the pilot and the copilot, so as to be accessible to each.

Figure 1:
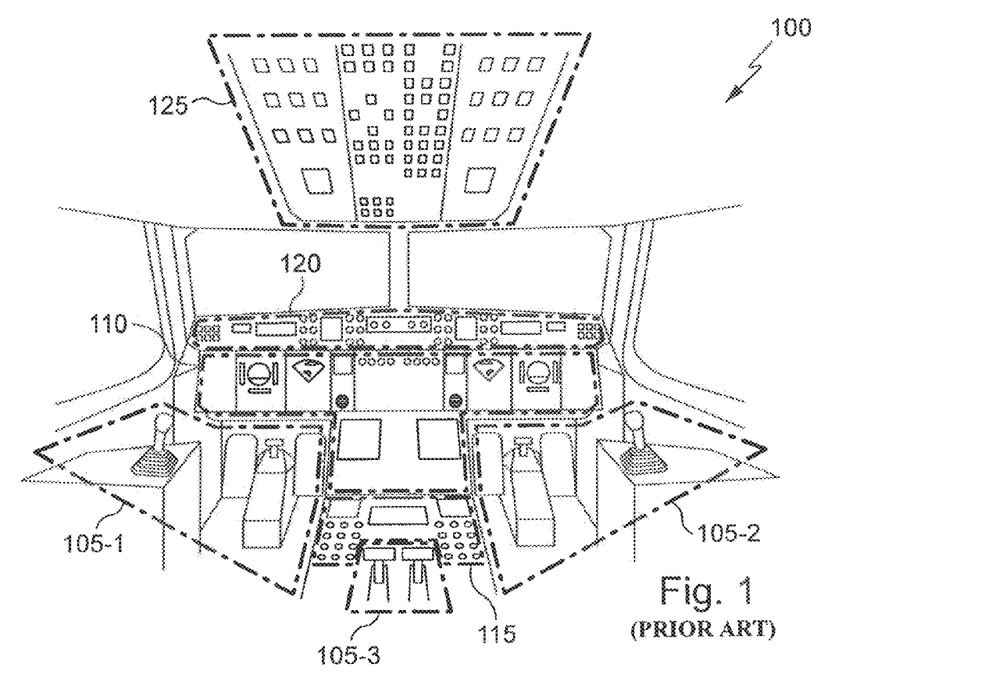
FIG. 1 is a schematic diagram of an aircraft cockpit showing the position of the control interfaces of the different systems of the aircraft.

FIG. 1 is a schematic representation of an aircraft cockpit showing the position of the control interfaces of the different systems of the aircraft.

As illustrated, cockpit interface 100 can be divided into five main zones: the flight commands of the pilot and copilot, referenced 105-1, 105-2 and 105-3, the avionics control and mission management interfaces, referenced 110, 115 and 120, the main purpose of zone 120 being control of the automatic pilot, and the command interface of the support subsystems, referenced 125.

The flight controls referenced 105-1 to 105-3 have the purpose of controlling the main devices used to pilot an aircraft, and thus in particular of controlling yaw, pitch and roll. These commands are often mechanical or electrical.

The avionics control interface generally comprises a large number of buttons, each having a particular function. These buttons are substantially multi-position buttons, especially of the start/stop type as well as buttons of rotary switch type for defining values.

By virtue of the complex nature of the input information items, the mission management interface comprises alphanumeric input keys as well as pointing devices. Examples of the pointing device are a control ball, known as trackball in English terminology, or a tactile pad, known as touchpad in English terminology.

The support subsystem command interface, installed in the ceiling and known as OVHP (the initials for OVer Head Panel in English terminology) or OVH, comprises substantially multi-position buttons, especially of the start/stop type as well as buttons of rotary switch type. These buttons are generally provided with an illumination system, for example with the light shining through, by means of which an anomaly of the functionality associated with the button can be indicated. This system of signaling by illumination of buttons makes it possible to install a system management philosophy known as dark cockpit philosophy in English terminology, which consists in indicating the nominal state of a function by the dark state of its command buttons and, conversely, in indicating an abnormal state by the illuminated state of its command buttons. The application of this philosophy therefore makes it possible to identify a button quickly when a problem is detected and to view the status of all of the support subsystems.

Although the command interface for the avionics, navigation aid systems and support subsystems is entirely satisfactory to the pilots, it nevertheless has certain disadvantages. In particular, because of the number of necessary buttons there is a non-negligible risk that one button will be selected instead of another. Furthermore, because of the limited space suitable for accommodating them (they must be accessible to both the pilot and copilot), the buttons are close to one another, thus increasing the risk that one button will be selected instead of another.

The object of the invention is to improve the cockpit interface in order to reduce the workload of the pilot and to improve the safety of aircraft.

The object of the invention is therefore a method for aiding in the control of systems installed on board an aircraft comprising at least one display device capable of displaying configuration parameters of the said aircraft and at least one associated acquisition device, this method comprising the following steps, determining the state of the said aircraft;
selecting, according to the said state of the said aircraft, a plurality of elements to be displayed on the said at least one display device in a predetermined set of elements comprising at least one parameter for configuration of the avionics, at least one parameter for configuration of support subsystems and at least one activatable representation of least one command of support subsystems of the said aircraft; and
displaying the said plurality of elements on the said display device.

The method according to the invention therefore makes it possible to improve the control interface of the systems of the aircraft and to limit the risks of errors associated in particular with bad acquisitions. This method also makes it possible to reduce the costs of manufacture of aircraft by reducing the cabling necessary for control of the systems. Furthermore, this method makes it easy to personalize the control interface.

Advantageously, the method additionally comprises a step of acquiring, of validating, of modifying or of activating at least one selected element.

According to a particular embodiment, the said set of elements additionally comprises at least one link to at least one preselected element of the said set of elements, the method additionally comprising a step of choosing at least one element of the said plurality of elements with the aid of the said acquiring means and, in response to the said choice, selecting and displaying the said at least one preselected element. In this way the method according to the invention makes it possible to guide the crew in the tasks that they must perform.

According to another particular embodiment, the method additionally comprises a step of detecting at least one fault, at least one element of the said set of elements being associated with the said at least one fault, and, in response to the said detection of the said at least one fault, selecting and displaying the said at least one element associated with the said at least one fault. In this way the method according to the invention makes it possible to improve the reactivity of the crew as a function of detected events.

Preferably the method additionally comprises a step of determining a level of priority associated with the said at least one fault, the said selection of the said at least one element associated with the said at least one fault being determined in response to the said detection of the said at least one fault and to the said level of priority. In this way the method according to the invention makes it possible to improve the reactivity of the crew even more as a function of detected events, according to the importance thereof and/or the possible consequences thereof.

Advantageously the method additionally comprises a step of analyzing the said at least one fault and, in response to the said analysis of the said at least one fault, transmitting an information item relating to the said at least one fault to a device for management of mission parameters, to permit this to determine a possible impact of the detected fault on the execution of the mission in progress or of a future mission.

According to a particular embodiment, at least one element of the said set of elements comprises an indication of at least one task and/or at least one verification to be performed, the method additionally comprising a step of validating the said indication. In this way the method according to the invention makes it possible to assist the crew in the tasks that they must perform.

According to another particular embodiment, the said activatable representation of at least one command of support subsystems of the said aircraft comprises an indication relating to the state of the device controlled by the said at least one command, the method comprising a step of determining the state of at least one device controlled by at least one command whose representation belongs to the said set of elements. In this way the crew is able to view the state of the support subsystems whose commands can be selected.

Another object of the invention is a device comprising means capable of employing each of the steps of the method described in the foregoing as well as an aircraft comprising this device.

Other advantages, objectives and characteristics of the present invention will become apparent from the detailed description hereinafter, provided by way of non-limitative example, with reference to the attached drawings, wherein.

Although the interfaces employed in an aircraft cockpit generally relate to presenting a maximum of commands to the pilot and copilot, these commands being grouped according to their functions, according to the invention only certain commands are simultaneously accessible, these commands, accessible via a centralized software interface, being determined according to a context.

The centralized interface makes it possible in particular to view the configuration of the aircraft, to configure it according to a normal mode of operation and to configure it according to a degraded mode of operation, to obtain a decision aid for operation of the aircraft when at least one fault is detected and to acquire technical information items used in particular for maintenance operations.

The context may be determined in several ways. According to a particular embodiment, the context is determined as a function of the state of the aircraft, such as starting, stopping or the phase of flight (taxiing on the ground, takeoff, climbing, cruising, descent, landing), as a function of the detection of a breakdown or fault and/or in response to a selection by the pilot.

The centralized software interface makes it possible to control certain devices of the aircraft, especially certain support subsystems, generally controlled by specific buttons, in order to permit selective, contextual and interactive access to the commands of these devices as well as the possibility of automatically sequencing several commands.

The state of the devices associated with these commands is displayed in connection with the representations of these commands. The accessible commands in this case are the commands with which the state of one or more devices can be modified directly via the interface.

Although the interface presented here makes it possible to replace all of the specific buttons, especially the buttons installed on the ceiling, it is nevertheless possible to retain some or all of these buttons, for example, to satisfy the needs of redundancy or to offer a double interface system that is particularly adapted to certain emergency situations. Thus the following different implementations may be employed:

all of the commands are accessible via the software interface and the specific buttons;

all of the commands are accessible via the software interface, certain commands also being accessible via specific buttons;

all of the commands are accessible via the software interface, none being accessible via specific buttons;

certain commands are accessible via the software interface, all of these commands being accessible via the specific buttons; and, certain commands are accessible via the software interface, and certain commands are accessible via specific buttons, some commands able to be accessible via the software interface and specific buttons.

Furthermore, the cockpit is reorganized to permit interaction between the avionics, comprising the flight management systems, and the control and command systems of the support subsystems. In this way, for example, the change of a parameter in a support subsystem having an impact on the mission in progress is transmitted to the flight management functions to alert the pilot and permit him to adapt the mission without manually acquiring the data.

Figure 2:
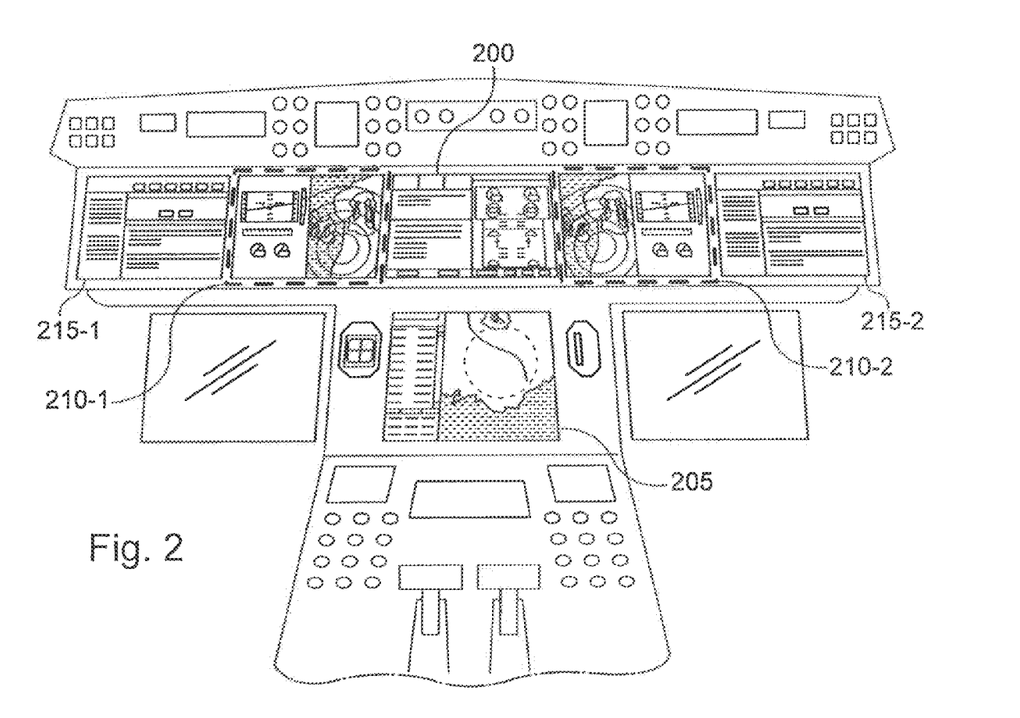
FIG. 2 illustrates an example of a cockpit configuration adapted to implement the invention.

FIG. 2 illustrates an example of a cockpit configuration adapted to implement the invention.

The cockpit comprises a central technical control screen 200, known as TMD (initials for Technical Management Display in English terminology), and a central mission management screen 205, known as MMD (initials for Mission Management Display in English terminology).

The cockpit also comprises two primary screens 210-1 and 210-2, known as PD (initials for Primary Display in English terminology), and two complementary screens 215-1 and 215-2 of OIS/CDS type (initials for Onboard Information System and Control and Display System in English terminology), situated in front of the pilot and copilot respectively.

Screens 200 and 205 are used as the main interface for management of the avionics, support subsystems and mission parameters, in cooperation with acquisition means such as a keyboard, a pointing device for moving a cursor and/or a touch technology combined with one or both screens. The pointing device is, for example, a trackball or a touchpad.

The interface employed via screens 200 and 205 makes it possible in particular to define and modify the technical configuration parameters and the mission parameters.

In addition, this interface makes it possible, preferably with the aid of screen 200, to manage the mission functions such as displaying alert messages, employing functions that aid in the decisions concerning operation of the aircraft when at least one fault is detected, looking up the on-board journal, known as logbook in English terminology, and acquiring entries therein.

Similarly, this interface is used, preferably with the aid of screen 205, as a flight management system, known as FMS (initials for Flight Management System in English terminology), for execution of mission applications and operational applications, especially applications that calculate the performance of the aircraft.

Figure 3:
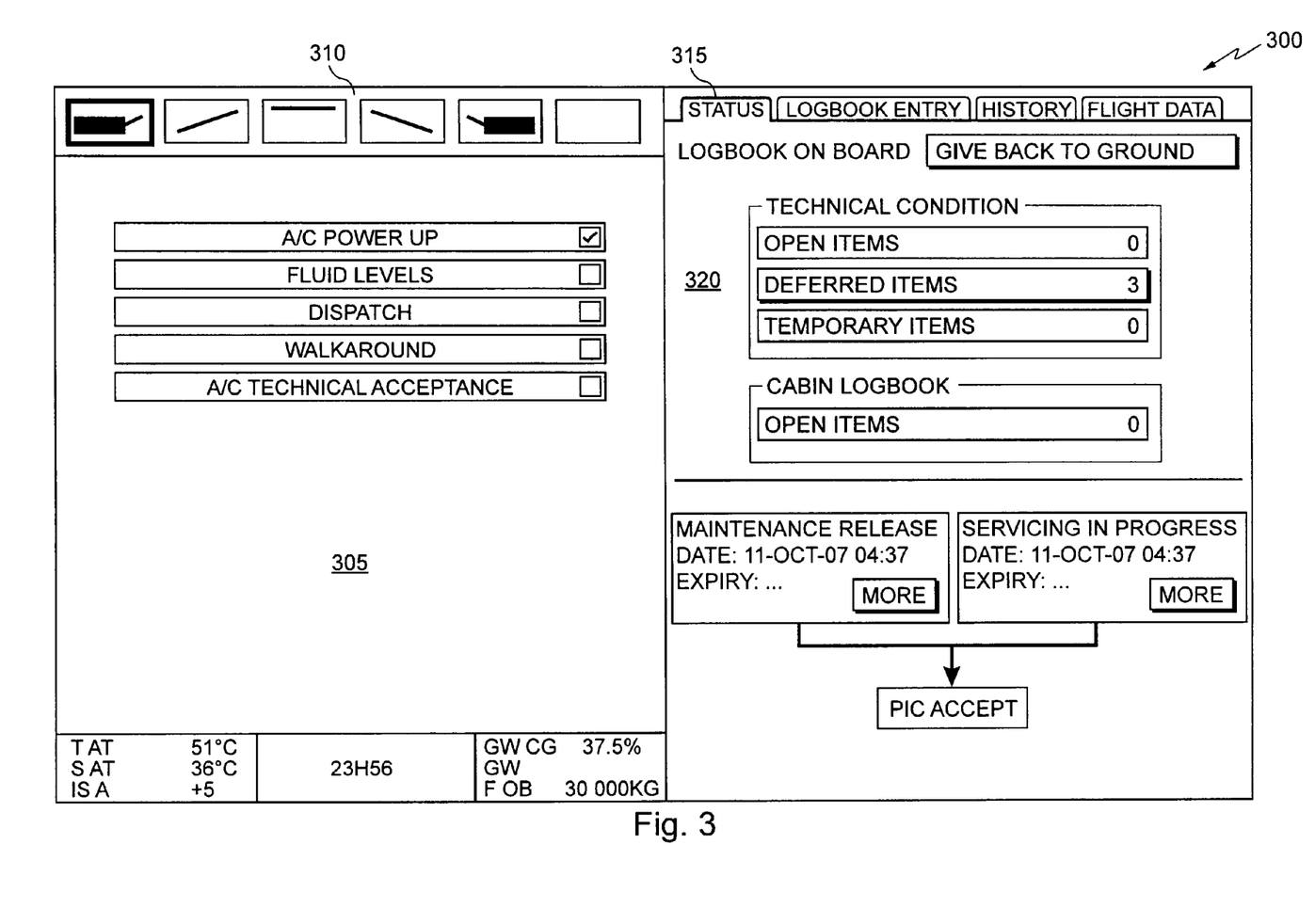
FIGS. 3 to 5 show pages of an example of a man-machine interface making it possible to access the parameters of the aircraft in hierarchical and contextual manner in order to control, modify and/or acquire them as well as to access activatable representations of commands via the interface.

FIG. 3 shows a first page of an example of a man-machine interface for accessing the aircraft parameters in hierarchical and contextual manner, in order to control, modify and/or acquire them as well as to access activatable representations of commands via the interface. In this case interface 300 comprises a part, situated at the left, for selecting the actions or the verifications to be performed (reference 305) according to the state of the aircraft (reference 310).

Advantageously, the state of the aircraft is determined automatically. On the basis of this state, the accessible functions and parameters are determined and presented to the pilot. The functions are advantageously grouped according to their nature. According to the example presented in FIG. 3, the aircraft is on the ground and is being prepared for a mission, as illustrated by the selection of the icon situated at the top left. The starting parameters have been entered and verified, since the "A/C power up" indication has been validated. The pilot can now verify the level of the fluids ("Fluid levels"), the capacity of the aircraft to undertake the mission ("Dispatch") and other parameters of the aircraft ("Walkaround"), or can accept the technical parameters of the aircraft associated with the mission to be undertaken ("A/C technical acceptance").

The right part of the interface is used in this case to present and modify information items such as statuses, a logbook, a history and flight data. These information items can be selected according to their category, for example with the help of tabs as illustrated. In the present case, tab 315, associated with status information items, is selected. This tab makes it possible in particular to access the list of detected faults, known as "open items", and the list of deferred detected faults, known as "deferred items", from zone 320.

The contextualization of access to parameters and to functions additionally makes it possible to guide the pilot in the configuration of the aircraft and in the verifications to be performed. In this way it is possible to employ verification means in order to signal anything overlooked to the pilot, for example in the form of an alert message.

Page 300 can be used as the main page for accessing the parameters and functions accessible via this interface.

Figure 4:
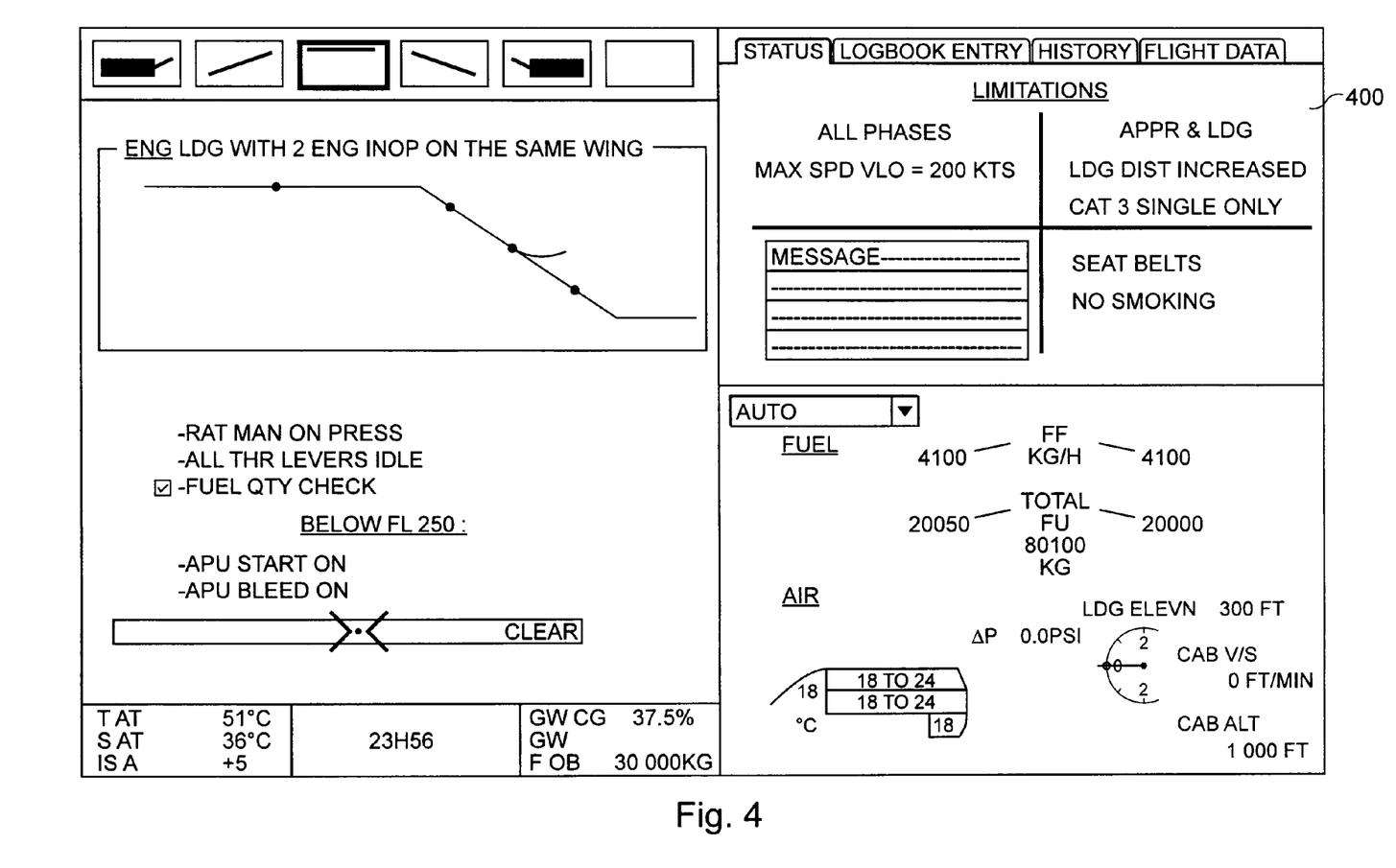

FIG. 4 shows a second page of an example of a man-machine interface for accessing the aircraft parameters in hierarchical and contextual manner, in order to control, modify and/or acquire them as well as to access activatable representations of commands via the interface. This page makes it possible in particular to display the limitations and the functional and operational conditions of the aircraft (reference 400). This page can be accessed from interface 300 by selecting the "dispatch" button of the left part of the page. According to the example presented in FIG. 4, the aircraft is in cruising phase, as illustrated by the selection situated at the top center of the left part.

Figure 5:
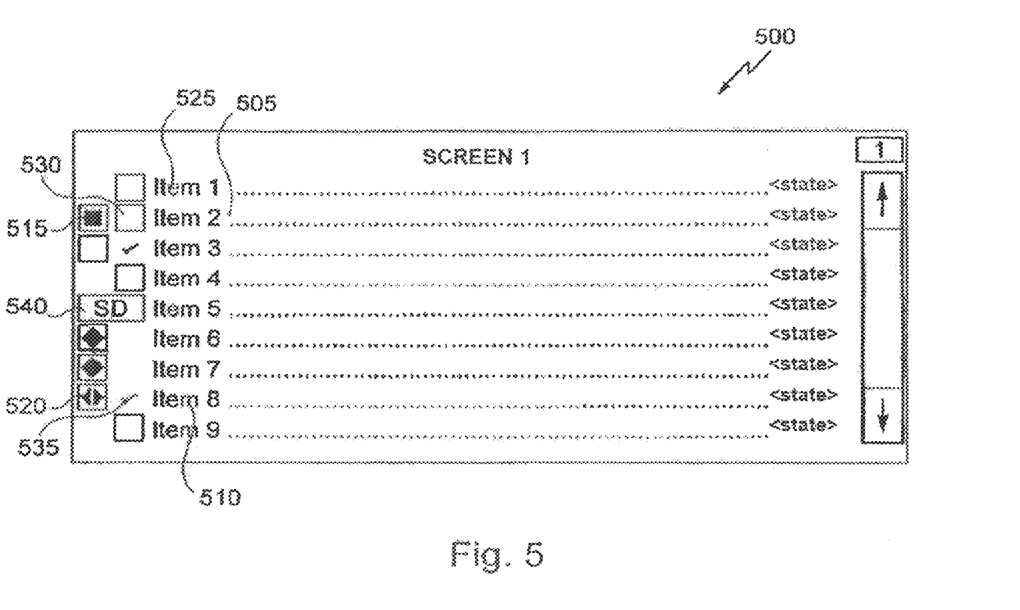

FIG. 5 shows a third page of an example of a man-machine interface for accessing the aircraft parameters in hierarchical and contextual manner, in order to control, modify and/or acquire them as well as to access activatable representations of commands via the interface. The example illustrated shows, for example, a page automatically displayed when an insufficient fuel pressure is detected or when smoke is detected. This page permits the pilot to be warned of the fault, to verify the parameters of the elements associated with this incident and to take the necessary actions.

Text interface 500 makes it possible in particular to select groups of commands or block diagrams by using links associated with the presented lines and to guide the pilot or copilot in performing the necessary configurations. Each line in this case represents one or more tasks and/or verifications to be performed or one or more functions.

Interface 500 such as represented contains two rows of indicators, situated on the left of the screen, each indicator being associated with one line. The first column indicates the presence or absence of a link. In other words, when a square is represented in the first column, it means that a link is associated with the line. When this square contains arrows, the link makes it possible to reach a group of commands, for example in the form of a block diagram. The second column provides an indication relating to execution of actions or verifications corresponding to the object of the line under consideration. This indication may be automatically updated if the actions or verifications have been performed via the software interface or manually updated if the actions or verifications were performed via the ceiling buttons, for example.

Thus, by way of illustration, lines 505 and 510 comprise indicators 515 and 520 in the first column, showing that they are associated with a link, whereas line 525 does not have any link. It will be noted in addition that indicator 520 contains arrows indicating that it is possible, from this indicator, to reach parameters and/or representations of commands relating to the object of line 510. Similarly, it should be noted that indicator 530 shows that the actions and/or verifications associated with the object of line 505 have not been executed, while indicator 535 shows that the actions and/or verifications associated with line 510 have been effected. Indicator 540 relates to a link making it possible to reach representations of commands accessible via software interface 500, execution of which can be indicated by a particular color (the initials SD, which stand for System Display in English terminology, indicate here that the corresponding command or commands is or are accessible via the software interface).

Furthermore, the interface presented in FIG. 5 comprises, on the right part of the screen, scroll arrows with which the text situated above or below the displayed text can be viewed.

Naturally, other types of indicators may be used.

The interface comprises several pages, which in particular can be presented in text form or in the form of block diagrams. The composition of these pages can be predetermined and stored in memory in a database. This composition may also be determined dynamically according to the selections of the pilot or copilot, the state of the aircraft and/or the detected events.

According to a particular embodiment, the pages that are to be displayed are determined according to a mechanism of links such as described in the foregoing, to the state of the aircraft and to the detected events, such as a fault, in which case a correspondence table between the detected events and the pages that must be displayed is established.

Advantageously, the detection of a fault leads to the display of the page containing the parameters and/or the representations of commands corresponding to this fault, as a function of the predetermined correspondence table.

A priority mechanism may be employed. Thus, if a fault that does not have an important consequence is detected, a simple alert may be generated, the page comprising the parameters and/or the representations of the corresponding commands being displayed only after acceptance by the pilot or copilot. For a fault having direct consequences for the safety of the aircraft, the page comprising the parameters and/or the representations of the corresponding commands is displayed directly, to permit the pilot or copilot to take the necessary actions rapidly.

Figure 6:
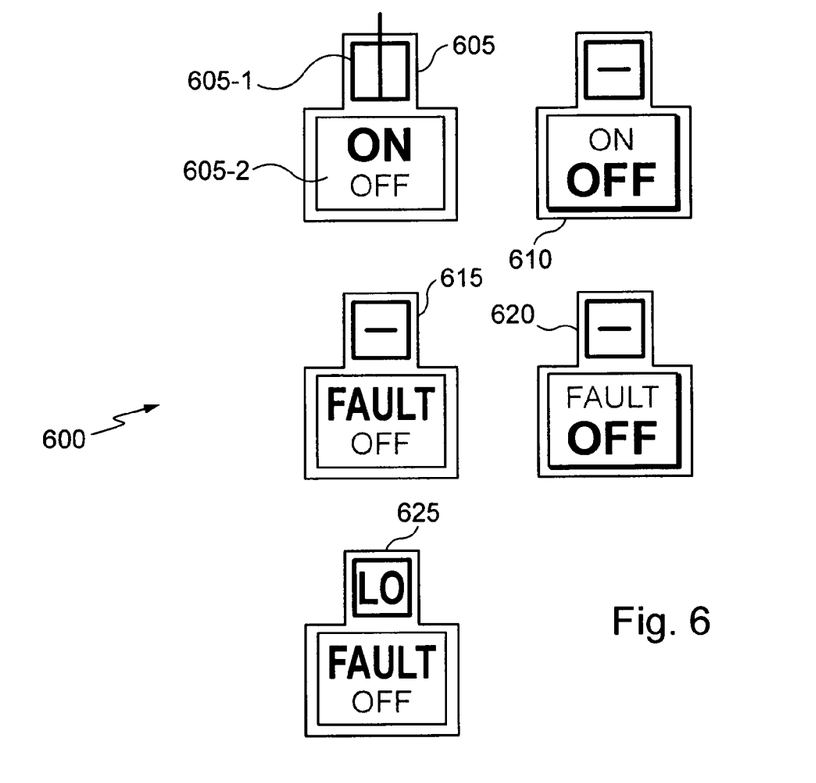
FIG. 6 illustrates an example of representation of a command that can be used to access the command of the associated support subsystem and to view its state.

FIG. 6 illustrates an example of a representation of a command that may be used to access a command, in this case a support subsystem command, and to view the state of the support subsystem.

Thus reference 600 relates to the representation of a command according to several states of the command and of the associated support subsystem. In the present case a pump command is considered.

Reference 605 presents the command and the state of the pump when it is activated ("on"). Virtual button 605 in this case comprises two parts, a part 605-1 in which there is represented an icon indicating the status of the support subsystem and a part 605-2 describing the state of the command as well as the status of the support subsystem in text form. The command represented here is a binary command ("on" or "off"), and so it is sufficient to select representation 605 and operate an activation button to change its state. Thus, for example, representation 605 may be selected by means of a pointer such as a mouse, and the state may be changed by a click of the mouse. Other methods may also be used, such as a touch screen in which the state of the command can be selected and changed directly.

Reference 610 presents the command and the state of the pump when it is deactivated ("off"). As illustrated, the icon is modified to indicate the state of the pump, and the text is changed.

Reference 615 presents the command and the state of the pump when a fault is detected ("fault"). As illustrated, the icon is modified to indicate the deactivated state of the pump, even though the pump has not been stopped.

Reference 620 presents the command and the state of the pump when a fault is detected ("fault") but the pump is voluntarily deactivated ("off"). As illustrated, the icon is modified to indicate the deactivated state of the pump.

Finally, reference 625 presents the command and the state of the pump when a fault is detected ("fault") but the pump continues to operate in a degraded mode. As illustrated, the icon is modified to indicate the degraded state of the pump ("lo"). A corresponding text indication is displayed ("fault").

A color code may be associated with the representations of the commands. For example, the icons may be green if the support subsystem is operating correctly, orange if it is in a degraded mode and red if it is faulty. In this way the pilot and copilot can view the state of the represented support subsystems at a single glance.

It should be noted here that, if a command of the software interface can be used in a manner similar to that of a ceiling command to accomplish an action, a command of the software interface can also be associated with a sequence of other commands. This type of command offers numerous advantages in terms of reaction time and in terms of updating the functions of an aircraft, since a command may be modified or added at any time.

By way of illustration, one command may simultaneously control the opening or closing of a valve as well as the starting or stopping of a pump. In this case, the representation of the support subsystem preferably indicates the state of all of the controlled support subsystems. Thus a breakdown state will be displayed if either the pump or the valve is defective.

Figure 7:
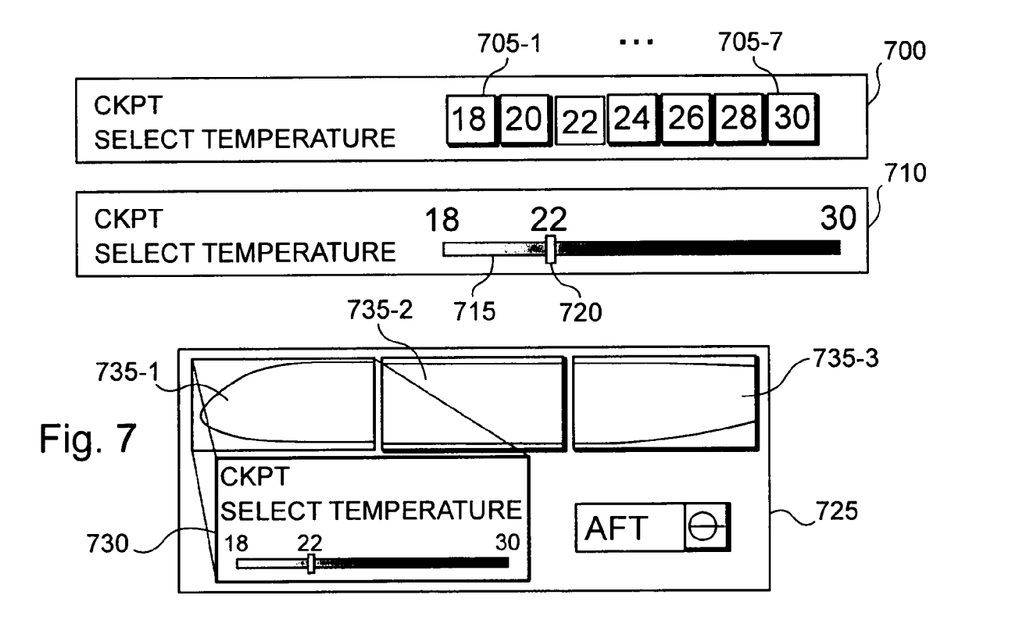
FIG. 7 illustrates an example of control of a parameter, such as the temperature, that can take on several values, via a representation of the associated command.

FIG. 7 illustrates an example of control of a parameter, in this case the temperature, that can have several values. According to the example referenced 700, the temperature is selected with the aid of several buttons referenced 705-1 to 705-3, each button corresponding to one temperature. Alternatively, according to the example referenced 710, the temperature is selected by moving a cursor 720 along a graduated bar 715.

The selection of the temperature may be coupled with a zone selection mechanism as illustrated by reference 725. According to this example, a temperature selection mechanism 730, such as mechanism 700 or mechanism 710, is associated with several buttons referenced 735-1 to 735-3, permitting a zone of the aircraft to be selected. The temperature regulated with the aid of mechanism 730 corresponds to the activated zone or zones.

Figure 8:
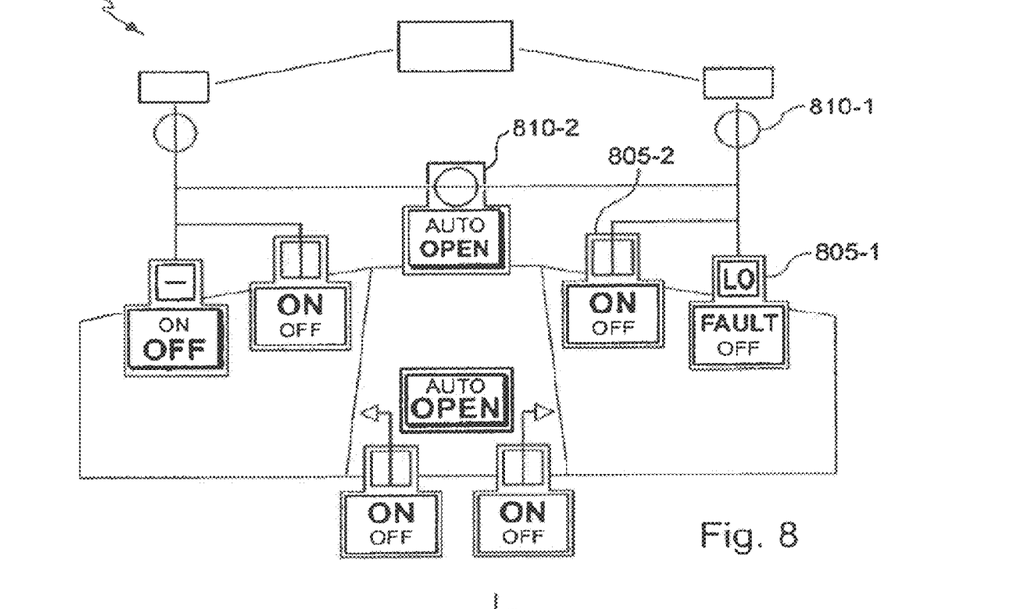
FIG. 8 shows a block diagram comprising representations of commands such as those illustrated in FIGS. 6 and 7, these representations being capable of being used to access the commands.

Advantageously, the commands illustrated in FIGS. 6 and 7 are integrated into block diagrams such as that represented in FIG. 8, in order to make it possible to view the controlled support subsystem in its environment. Such a block diagram can be reached from a link such as those presented in reference to FIG. 5.

The diagram illustrated here concerns a fuel-management system generically referenced 800. This diagram makes it possible to view the relationships between the different commands as well as their effects. For example, it is easy to see that commands 805-1 and 805-2 address redundant system elements and that pump 805-1, functioning in degraded mode, is backed up by pump 805-2 to convey the fuel to open valves 810-1 and 810-2.

According to a particular embodiment, the granularity of block diagrams is variable. Thus each command shown may relate to one element or a to a set of elements. The displayed state then represents the state of one element or of a set of elements. Depending on the parameters used, the selection of a command makes it possible to modify the state of the command or to access the different elements controlled by the command.

Figure 9:
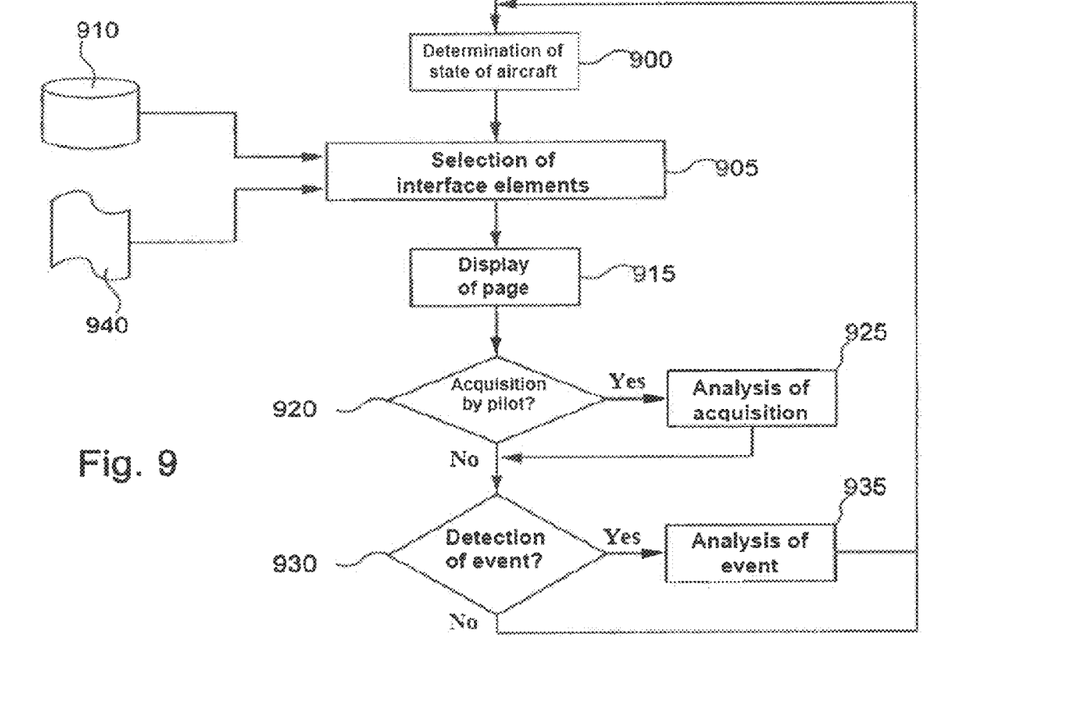
FIG. 9 illustrates an example of an algorithm employed to control the elements of the software interface making it possible to access pages comprising parameters to be verified, modified or acquired and/or representations of commands.

FIG. 9 illustrates an example of an algorithm employed to control the elements of the software interface with which it is possible to access pages comprising parameters to be verified, modified or acquired and/or representations of commands.

A step 900 relates to determining the state of the aircraft compared with a list of predetermined states, such as starting, stopping or the phase of flight, especially taxiing on the ground, takeoff, climbing, cruising flight, descent or landing.

A step 905 has the purpose of selecting the elements of the software interface are to be displayed, or in other words determining parameters and/or commands for which a representation is to be displayed. As described in the foregoing, this selection may be achieved according to the inputs of the pilot or copilot, to the state of the aircraft, and/or to detected events. By default, elements for accessing the different block diagrams are displayed in text or graphical form. These elements, for example, are stored in memory in a database 910 in the form of predetermined screen pages.

After they have been determined, these elements are displayed (step 915) in the form of a page.

A test is then performed to determine whether the pilot or copilot has selected an element of the displayed page or has acquired a datum linked to the software interface (step 920). If the pilot or copilot has selected an element of the displayed page or has acquired a datum linked to the software interface, an analysis of the acquisition is performed (step 925) so that it may be taken into account, especially to know whether it relates to the acquisition or modification of a parameter of the aircraft, to the activation of a command or to the selection of a link permitting the display of a new page.

Another test is then performed to determine if an event has been detected (step 930). In this case an event is a fault, a change of configuration, or more generally any change that can be detected, preferably automatically.

If an event is detected, an analysis of the event is performed (step 935) to determine the consequences thereof and to determine if it is appropriate to modify the contents of the displayed page.

The preceding steps are then repeated to determine the contents of the displayed page once again, if necessary.

The selection of elements of the displayed page then takes the state of the aircraft into account and, as the case may be, the acquisition performed by the pilot or copilot and/or the detected event.

Advantageously, the screen pages are organized hierarchically to permit navigation from one to the other according to the state of the aircraft, to an acquisition performed by the pilot (or copilot) and/or to detected events or to particular configurations. The structure of the hierarchy, for example, is stored in memory in file 940, which can be stored in memory in database 910 or in another storage zone.

The determined elements are then displayed (step 915) and the process is continued.

Figure 10:
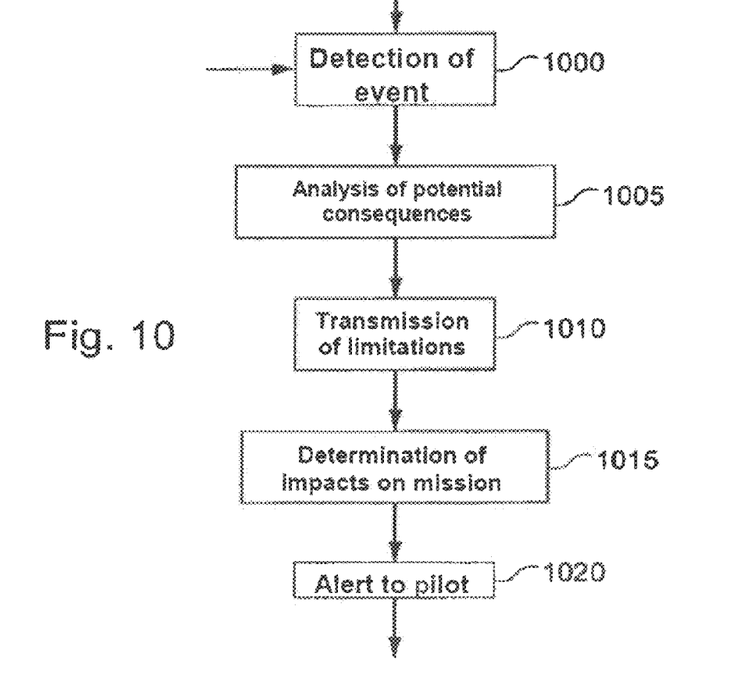
FIG. 10 represents an example of an algorithm that can be used to contextualize the display of mission parameters when a technical fault is detected.

FIG. 10 represents an example of an algorithm that can be used to contextualize the display of mission parameters when a technical fault has been detected in the avionics.

After an event has been detected and has been determined to be associated with a technical fault (step 1000), the potential consequences of the fault are analyzed (step 1005) in order to determine the limitations that may result from the fault as regards the progress of a mission. These limitations are transmitted to the mission parameters management device (step 1010).

A following step has the purpose of determining the consequences of the fault for the mission in progress or for a future mission (step 1015), by correlating these consequences and the mission parameters.

If the fault has an impact on the mission or on a future mission, the pilot is alerted (step 1020). The alert may be a simple message, a graphical representation of limitations due to the detected fault, and/or a proposal for modification of the mission.

Figure 11:
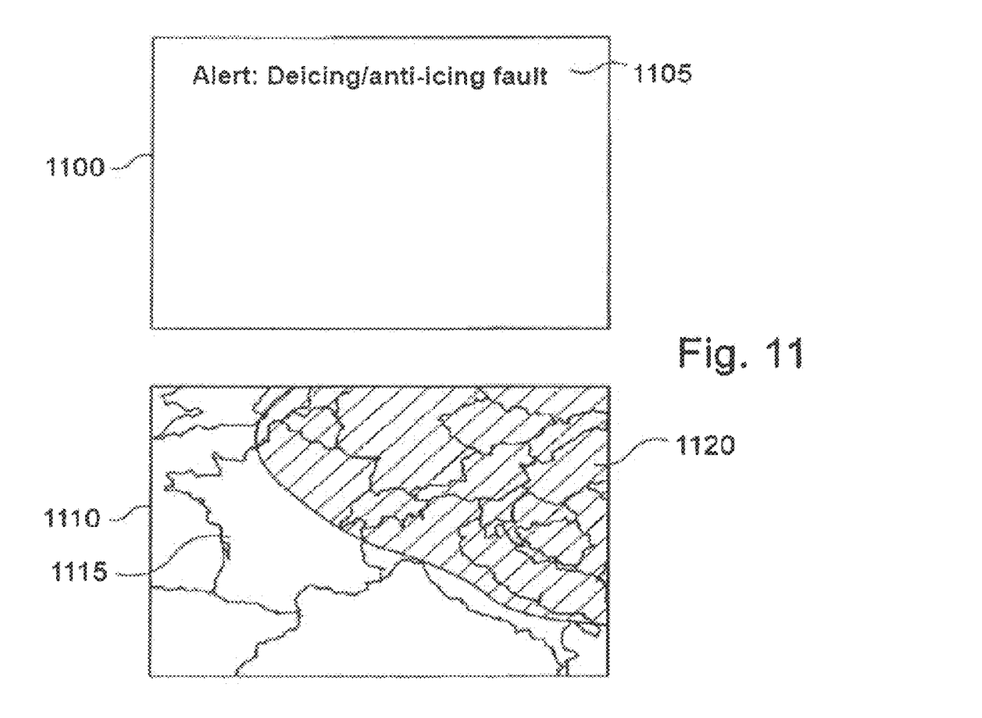
FIG. 11 illustrates an example of pages displayed on the parameter control screens of an aircraft and of mission parameters when a technical fault is detected, in conformity with the algorithm represented in FIG. 10.

FIG. 11 illustrates an example of pages displayed on the parameter control screens of an aircraft and of mission parameters when a technical fault has been detected, according to the algorithm represented in FIG. 10.

Page 1100 capable of being displayed on central technical control screen 200 in this case comprises an alert in the form of message 1105, indicating failure of the deicing system, also known as deicing or anti-icing in English terminology.

Page 1110 capable of being displayed on central mission management screen 205 is this case contains a cartographic background 1115 representing the zone over which the aircraft is flying in the course of the mission, or part thereof, on which background there is superposed a zone 1120 that is to be avoided that is indicated, for example, with the aid of a particular texture and/or color, preferably leaving the cartographic background partly visible. Zone 1120 represents a zone to be avoided because of the detected fault. In this case it is a zone in which the temperature is such as to pose a risk of formation of ice on the aircraft.

Figure 12:
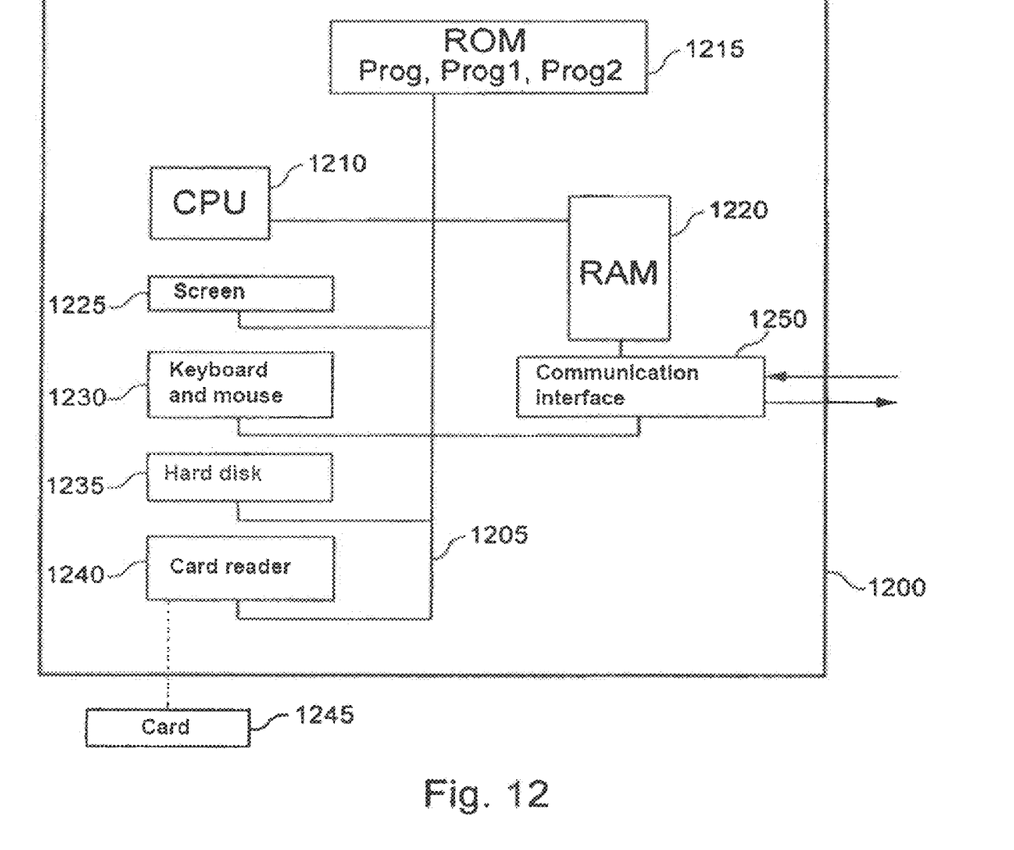
FIG. 12 illustrates an example of a physical architecture adapted for implementation of the invention.

FIG. 12 illustrates an example of physical architecture adapted to implement the invention. In this case device 1200 is provided with a communication bus 1205, to which there are connected:
  a central processing unit or microprocessor 1210 (CPU, initials for Central Processing Unit in English terminology);
  a read-only memory 1215 (ROM, acronym for Read Only Memory in English terminology), that can comprise the programs necessary for implementation of the invention;
  a random access memory or cache memory 1220 (RAM, acronym for Random Access Memory in English terminology), comprising registers capable of recording the variables and parameters created and modified in the course of execution of the aforesaid programs; and,
  a communication interface 1250, capable of transmitting and receiving data, especially to and from the support subsystems in order to control and know their state.

Preferably, device 1200 also has the following elements:
  a screen 1225, for viewing data such as representations of commands and for acting as a graphical interface with the user, who will be able to interact with the programs according to the invention, with the aid of a keyboard and of a mouse 1230, or of another pointing device such as a touch screen or a remote control;
  a hard disk 1235, that can comprise the aforesaid programs and data processed or to be processed according to the invention; and
  a memory card reader 1240 adapted to receive a memory card 1245 and to read or write therein data processed or to be processed according to the invention.

The communication bus permits communication and interoperability among the different elements included in device 1200 or connected thereto. The depiction of the bus is not limitative and, in particular, the central unit is capable of communicating instructions to any element of device 1200 directly or via another element of device 1200.

The executable code of each program permitting the programmable device to employ the processes according to the invention may be stored, for example, on hard disk 1235 or in read-only memory 1215.

According to one variant, memory card 1245 may contain data, especially a table of correspondence between the detected events and the commands that may be requested, as well as the executable code of the aforesaid programs which, once it has been read by device 1200, will be stored on hard disk 1235.

According to another variant, it will be possible for the executable code of the programs to be received at least partly via interface 1250 to be stored in a manner identical to that described in the foregoing.

More generally, it will be possible for the program or programs to be loaded into one of the storage means of device 1200 before being executed.

Central unit 1210 will command and direct the execution of the instructions or portions of software code of the program or programs according to the invention, which instructions are stored on hard disk 1235 or in read-only memory 1215 or else in the other aforesaid storage elements. During boot-up, the program or programs that is or are stored in a non-volatile memory, such as hard disk 1235 or read-only memory 1215, are transferred to random-access memory 1220, which then contains the executable code of the program or programs according to the invention as well as registers for storing in memory the variables and parameters necessary for implementation of the invention.

Naturally, to satisfy specific needs, an individual competent in the field of the invention will be able to apply modifications in the foregoing description.

The invention claimed is:

1. A method for a device including a processor, the method for aiding in the control of systems installed on board an aircraft that includes at least one display device configured to display configuration parameters of the aircraft and at least one associated acquisition device, the method comprising steps of:
    determining a state of the aircraft;
    selecting based on the determined state of the aircraft, using the processor, a subset of displayable elements from a set of possible displayable elements that include at least one parameter for configuration of avionics, at least one parameter for configuration of support subsystems, and at least one activatable representation of at least one command of the support subsystems of the aircraft, the activatable representation including an indication relating to a state of a device of the support subsystems controlled by the at least one command; and
    displaying the subset of displayable elements on the display device.

2. The method according to claim 1, further comprising one of a step of acquiring, of validating, of modifying, and of activating at least one selected element of the subset of displayable elements.

3. The method according to claim 1, wherein the subset of displayable elements additionally includes at least one link to at least one preselected element of the subset of displayable elements, the method further comprising a step of choosing at least one element of the subset of displayable elements with the aid of the acquiring step and, in response to the choice, selecting and displaying the at least one preselected element.

4. The method according to claim 1, further comprising a step of detecting at least one fault, at least one element of the subset of displayable elements being associated with the at least one fault and, in response to the detection of the at least one fault, selecting and displaying the at least one element associated with the at least one fault.

5. The method according to claim 4, further comprising a step of analyzing the at least one fault and, in response to the analysis of the at least one fault, transmitting an information item relating to the at least one fault to a device for management of mission parameters.

6. The method according to claim 4, further comprising a step of determining a level of priority associated with the at least one fault, the selection of the at least one element associated with the at least one fault being determined in response to the detection of the at least one fault and to the level of priority.

7. The method according to claim 6, further comprising a step of analyzing the at least one fault and, in response to the analysis of the at least one fault, transmitting an information item relating to the at least one fault to a device for management of mission parameters.

8. The method according to claim 1, wherein at least one element of the subset of displayable elements includes an indication of one of at least one task and at least one verification to be performed, the method further comprising a step of validating the indication.

9. The method according to claim 1, further comprising a step of determining the state of the device controlled by the at least one command.

10. A device that includes a processor, the device comprising:
    a determining unit configured to determine a state of the aircraft;
    a selecting unit configured to select, based on the determined state of the aircraft, using the processor, a subset of displayable elements from a set of possible displayable elements that include at least one parameter for configuration of avionics, at least one parameter for configuration of support subsystems, and at least one activatable representation of at least one command of the support subsystems of the aircraft, the activatable representation including an indication relating to a state of a device of the support subsystems controlled by the at least one command; and
    a displaying unit configured to display the subset of displayable elements.

11. An aircraft comprising:
    a device including a processor,
        a determining unit configured to determine a state of the aircraft,
        a selecting unit configured to select, based on the determined state of the aircraft, using the processor, a subset of displayable elements from a set of possible displayable elements that include at least one parameter for configuration of avionics, at least one parameter for configuration of support subsystems, and at least one activatable representation of at least one command of the support subsystems of the aircraft, the activatable representation including an indication relating to a state of a device of the support subsystems controlled by the at least one command, and
        a displaying unit configured to display the subset of displayable elements.

12. The method according to claim 1, wherein
    the avionics correspond to one of piloting, navigation, communication, environmental monitoring, and mission management, and
    the support subsystems correspond to one of electrical capacity, hydraulic capacity, air conditioning and pressurization, fuel management, and auxiliary power engine.

13. The method according to claim 1, wherein the subset of displayable elements is different for different states of the aircraft.

14. The method according to claim 1, wherein the state of the aircraft corresponds to one of a starting state of the aircraft, a stopping state of the aircraft, and a phase of flight of the aircraft.

* * * * *